United States Patent
Thibodeau et al.

(10) Patent No.: US 11,644,880 B1
(45) Date of Patent: May 9, 2023

(54) METHOD AND DEVICE FOR BALANCING A SUPPLY CURRENT FROM MULTIPLE POWER SUPPLY UNITS BASED ON A COMMON LOAD SHARE SIGNAL

(71) Applicant: Dell Products L.P., Round Rock, TX (US)

(72) Inventors: Thomas R. Thibodeau, Whitinsville, MA (US); Haijin Zhang, Fujian (CN); Cui Xizhi, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/542,733

(22) Filed: Dec. 6, 2021

(51) Int. Cl.
G06F 1/26 (2006.01)
H05B 45/37 (2020.01)
G06F 1/3206 (2019.01)

(52) U.S. Cl.
CPC ............ *G06F 1/263* (2013.01); *G06F 1/3206* (2013.01); *H05B 45/37* (2020.01)

(58) Field of Classification Search
None
See application file for complete search history.

(56) References Cited

U.S. PATENT DOCUMENTS

| 7,157,890 | B1* | 1/2007 | Kris | H02J 1/102 |
| | | | | 323/272 |
| 7,893,734 | B2* | 2/2011 | Garcia | H03K 17/223 |
| | | | | 327/143 |
| 10,423,183 | B2 | 9/2019 | Chen et al. | |
| 2003/0141907 | A1* | 7/2003 | Canova | H02J 1/102 |
| | | | | 327/131 |
| 2006/0146634 | A1* | 7/2006 | Osada | G11C 5/147 |
| | | | | 365/163 |
| 2008/0320322 | A1* | 12/2008 | Green | G06F 1/3203 |
| | | | | 713/340 |
| 2014/0229755 | A1* | 8/2014 | Kris | H02J 1/102 |
| | | | | 713/340 |

* cited by examiner

*Primary Examiner* — Danny Chan
(74) *Attorney, Agent, or Firm* — Chamberlain, Hrdlicka, White, Williams & Aughtry (57) ABSTRACT

A method, device, and system for balancing a supply current in a Power Supply Units (PSUs). The system includes a plurality of PSUs connected in parallel to a power bus. The method includes detecting a falling edge in a common Load Share (LS) signal and, in response to detecting the falling edge of the LS signal, enabling a field effect transistor (FET) and starting a timer. Prior to starting the timer, a time trigger is determined for the timer based on a current output level of a power source in the PSU. The method includes outputting a current at the current output level for the duration of the time trigger and, at the time trigger, releasing the FET and resetting the timer. The PSU includes a processor that monitors the LS signal. The LS signal determines a timing for outputting current by the PSU.

14 Claims, 7 Drawing Sheets

METHOD AND DEVICE FOR BALANCING A SUPPLY CURRENT FROM MULTIPLE POWER SUPPLY UNITS BASED ON A COMMON LOAD SHARE SIGNAL

BACKGROUND

It is very common for storage enclosures or other IT infrastructures to use redundant power sources to achieve higher availability upon the failure of other power units. With electronic devices, such as data storage devices and the like, a plurality of power supply units are often used to supply power to the one or more electronic devices in need of power consumption. When using a plurality of power supply units, the supply currents of the power supply units must be managed to ensure operations and prevent imbalances. In such cases, the multiple power units may need to work in parallel to provide larger powers than a single unit can provide. Without such management, the output power of a power supply unit may exceed a maximum rated output current, which can reduce the service life of the power supply unit or, in severe situations, cause the power supply unit to fail entirely. Thus, sharing the currents from a plurality of power supply units requires management.

SUMMARY

In general, in one aspect, embodiments disclosed herein are directed to a method of balancing a supply current in a Power Supply Unit (PSU). The method includes detecting a falling edge in a common Load Share (LS) signal and, in response to detecting the falling edge of the LS signal, enabling a field effect transistor (FET) and starting a timer. Prior to starting the timer, a time trigger is determined for the timer based on a current output level of a power source in the PSU. The method includes outputting a current at the current output level for the duration of the time trigger and, at the time trigger, releasing the FET and resetting the timer.

In another aspect, embodiments disclosed herein are directed to a PSU that includes a power source that supplies an output current of the PSU and a current sensing device that measures the current output from the power source. The PSU includes a processor that monitors a LS signal. The LS signal determines a timing for outputting current by the PSU. The PSU also includes circuitry for controlling the timing of the output current and the LS signal.

In another aspect, embodiments disclosed herein are directed to a system for providing power that includes a plurality of PSUs connected in parallel to a power bus. Each of the PSUs includes a power source that supplies an output current of the PSU and a current sensing device that measures the current output from the power source. The PSU includes a processor that monitors a LS signal. The LS signal determines a timing for outputting current by the PSU. The PSU also includes circuitry for controlling the timing of the output current and the LS signal.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures.

In the below description, numerous details are set forth as examples of embodiments described herein. It will be understood by those skilled in the art, that have the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components.

Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments disclosed herein relate to a device, system, and method for balancing a supply current from multiple Power Supply Units (PSUs). More specifically, embodiments disclosed herein provide a PSU that includes a hardware (HW) circuit and firmware (FW) design to balance the output current from a plurality of PSUs.

Traditional methods of balancing currents are complicated and suffer from high costs. For example, methods may include artificially increasing the output impedance of a power source to force the current flowing to be equal among the different power sources. Although simple, such systems have a low level of current share accuracy. Another traditional method of balancing currents includes using an analog current sharing bus connected to all the PSUs. In such systems, the power supply unit with the maximum output current drives the voltage level of the current sharing bus, while the other PSUs correspondingly change their output currents based on the voltage of the current sharing bus. Such systems require a complicated analog circuit, which is unstable and susceptible to bus noises.

As another example, a communication current sharing bus may be connected to all power supply units to balance the currents. For example, an Internal Integrated Circuit (I²C) bus, Universal Asynchronous Receiver/Transmitter (UART) bus or Controller Area Network (CAN) bus may be used. These buses transmit current sharing information with each other and correspondingly adjust the currents. These systems require an intricate FW design and high performance microcontroller. Further, such systems are known to react slowly in response to sudden load changes because the sharing bus needs a large amount of time for intercommunication and adjustment.

Embodiments disclosed herein provide a current balancing method and device that creates simultaneous digital communication shared among multiple PSUs using a signal wire, similar to analog approaches. Embodiments may be implemented using an existing current sense signal of a power source. Embodiments require little additional hardware (e.g., a FET, a resistor, and a diode) when compared to any purpose-built chip. Embodiments may provide a highly reliable power system that balances the contributing currents to avoid overloading a single power source.

Figure 1:
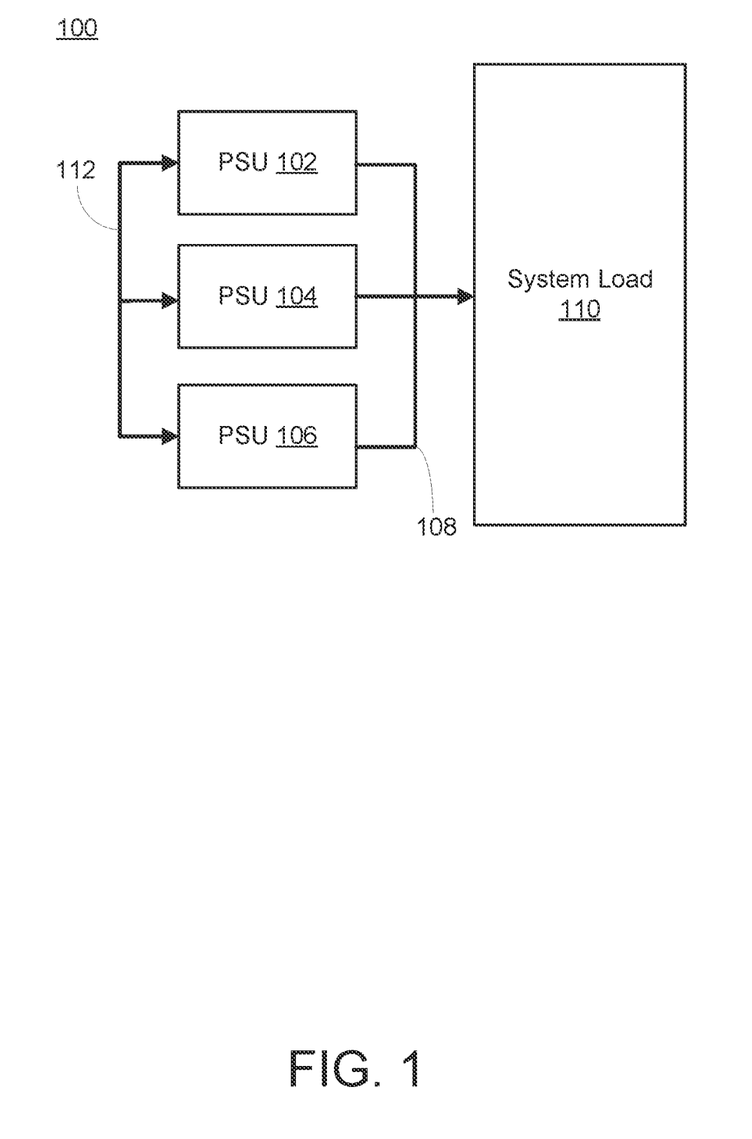
FIG. 1 shows a schematic of a power supply system in accordance with one or more embodiments disclosed herein.

FIG. 1 illustrates a power supply system (100) in accordance with embodiments disclosed herein. The power supply system (100) includes a plurality of PSUs (102, 104, 106) connected in parallel collectively supplying power to a system load (110). In the example of FIG. 1, three PSUs are shown for illustration purposes, but the number of PSUs is not limited. Each PSU may be considered, for example, an Uninterruptible Power Supply (UPS) or battery cell. In accordance with embodiments disclosed herein, the PSUs are connected in parallel and each PSU may provide a different amount of current.

The system load (110) refers to the one or more devices powered by the power supply system (100) such as electronic devices, memory, or the like. The PSUs (102, 104, 106) are connected to the system load (110) via a common power bus (108). Although the plurality of PSUs are shown as separate entities, the plurality of PSUs may also be integrated in a single power source device in accordance with embodiments disclosed herein.

In accordance with embodiments disclosed herein, the system uses a load share (LS) digital signal (112) that is shared among the multiple PSUs. The LS signal is an open drain signal common to each PSU (102, 104, 106) in the system (100). The LS digital signal (112) is a digital signal that includes a HIGH and a LOW state. The LS signal is used to disseminate the output currents using the PSU with a maximum output and the PSU with the minimum output using edge timing. As will be explained further with reference to FIGS. 3A-3D, this is accomplished by engineering the PSU with the maximum current to control the width of the LOW portion of the LS signal, and the PSU with the minimum current controls the width of the HIGH portion of the LS signal. As such, the minimum and maximum values of the output current are disseminated to each PSU. In accordance with embodiments disclosed herein, the resolution of both the HIGH and LOW portions of the LS signal may be 10 mS or less.

For example, in the simplest case of a system with a single PSU, the PSU controls the edges and duration of HIGH and LOW periods of the LS signal in proportion to the PSU's output current. In the case of multiple PSUs, the HIGH and LOW periods of the LS signal are controlled by the PSUs with the lowest and highest output currents, respectively.

Figure 2:
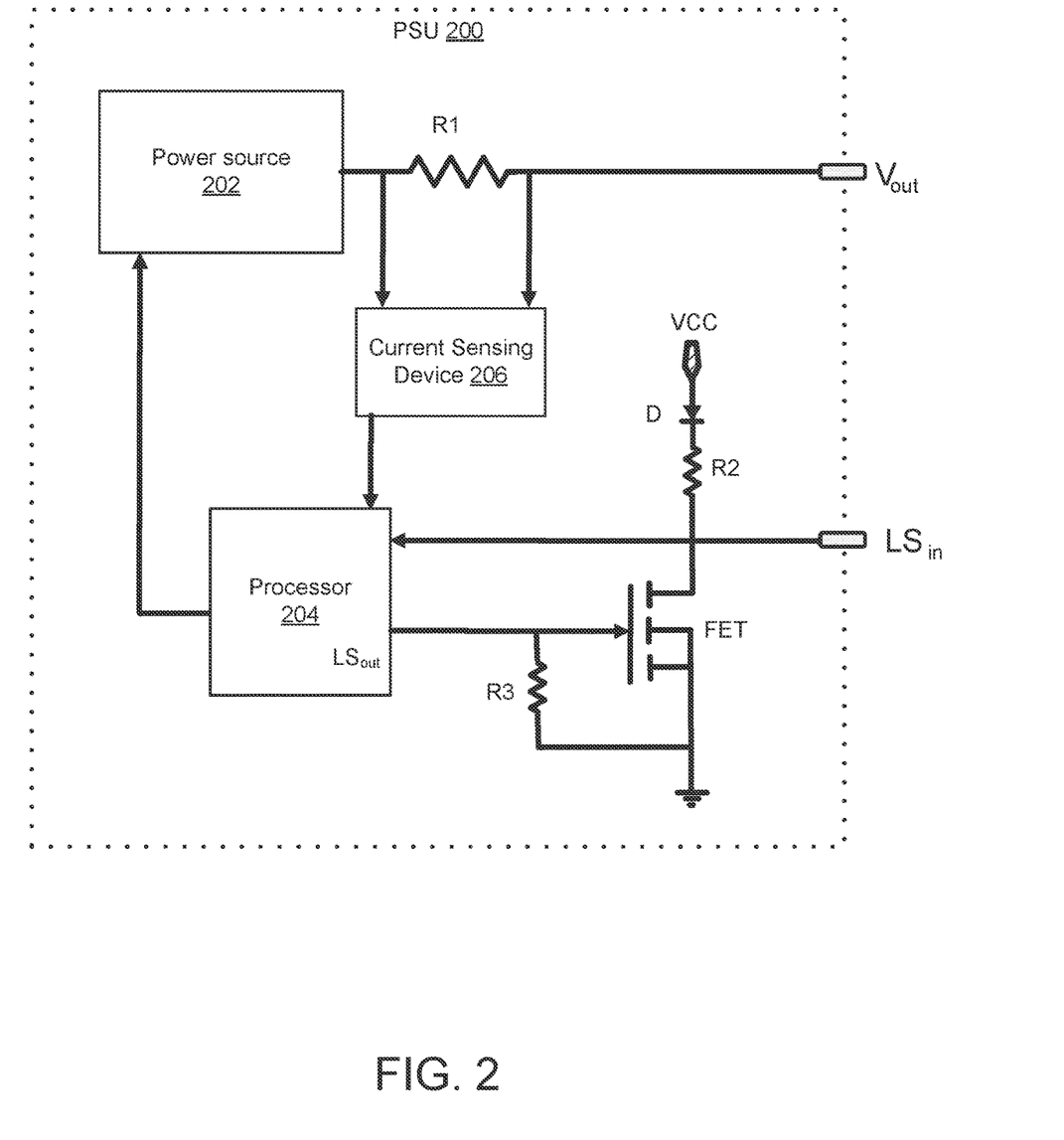
FIG. 2 shows a schematic of a power supply unit (PSU) in accordance with one or more embodiments disclosed herein.

FIG. 2 shows a schematic of a PSU (200) in accordance with one or more embodiments disclosed herein. The PSU (200) includes a power source (202) that provides the voltage and current. For example, the power source (202) may be a battery or other means of supplying a current. The PSU (200) includes a processor (204), such as a microprocessor. The processor (204) monitors the current from the power source (202) and the common LS signal (LSO from the other PSUs. As shown in FIG. 2, the processor (204) monitors the output current ($V_{out}$) from the power source (202) using a current sensing device (206) that measures across a resistor (R1). The processor (204) may also be responsible for controlling the power source (202), for example, using pulse width modulation (PWM) control.

In accordance with one or more embodiments disclosed herein, the processor (204) is responsible for an LS output signal ($LS_{out}$) directed to a field-effect transistor (FET). As shown in FIG. 2, the FET is connected to the common LS signal (LSO, as well as a resistor (R2) and diode (D) connected in series to a small (e.g., 3.3 V) voltage source (VCC). The FET is also connected to the processor via another resistor (R3). In accordance with embodiments disclosed herein, enabling the FET with the $LS_{out}$ signal may have the effect of pulling the common LS signal to the LOW amplitude.

In embodiments disclosed herein, in one aspect, the parallel PSUs use the LS signal in conjunction with the electronics of FIG. 2 to collectively act as a NOR gate in the LS signal. As described above, the LS output signal ($LS_{out}$) directed to the field-effect transistor (FET) may be enabled or released by the processor (204). When all the LS output signals ($LS_{out}$) from all the parallel connected PSUs are released, the resultant LS signal returns to a HIGH position. As will be explained further below, this triggering event causes each PSU to calculate any output voltage adjustments and restart timers. Thus, the output currents from the multiple PSUs are appropriately synchronized to balance the currents in accordance with embodiments disclosed herein.

FIGS. 3A-3D show flow charts in accordance with one or more embodiments disclosed herein. FIGS. 3A-3D describe methods performed by a PSU in accordance with embodiments described herein. The methods may be performed using FW associated with processor (204) of the PSU. The methods of FIGS. 3A-3D describe actions taken by the PSU in association with different interrupts in LS signal.

In embodiments disclosed herein, an interrupt for the falling edge of the LS signal (FIG. 3A); an interrupt for the rising edge of the LS signal (FIG. 3B); and an interrupt for timer trigger (FIG. 3C) are used to trigger methods disclosed herein. Further, a discharging of the current in a PSU is used to trigger methods (FIG. 3D) in accordance with embodiments disclosed herein. Performing the triggered interrupts in accordance with methods of FIGS. 3A-3D ensure that each PSU remains in synchronization.

Figure 3A:
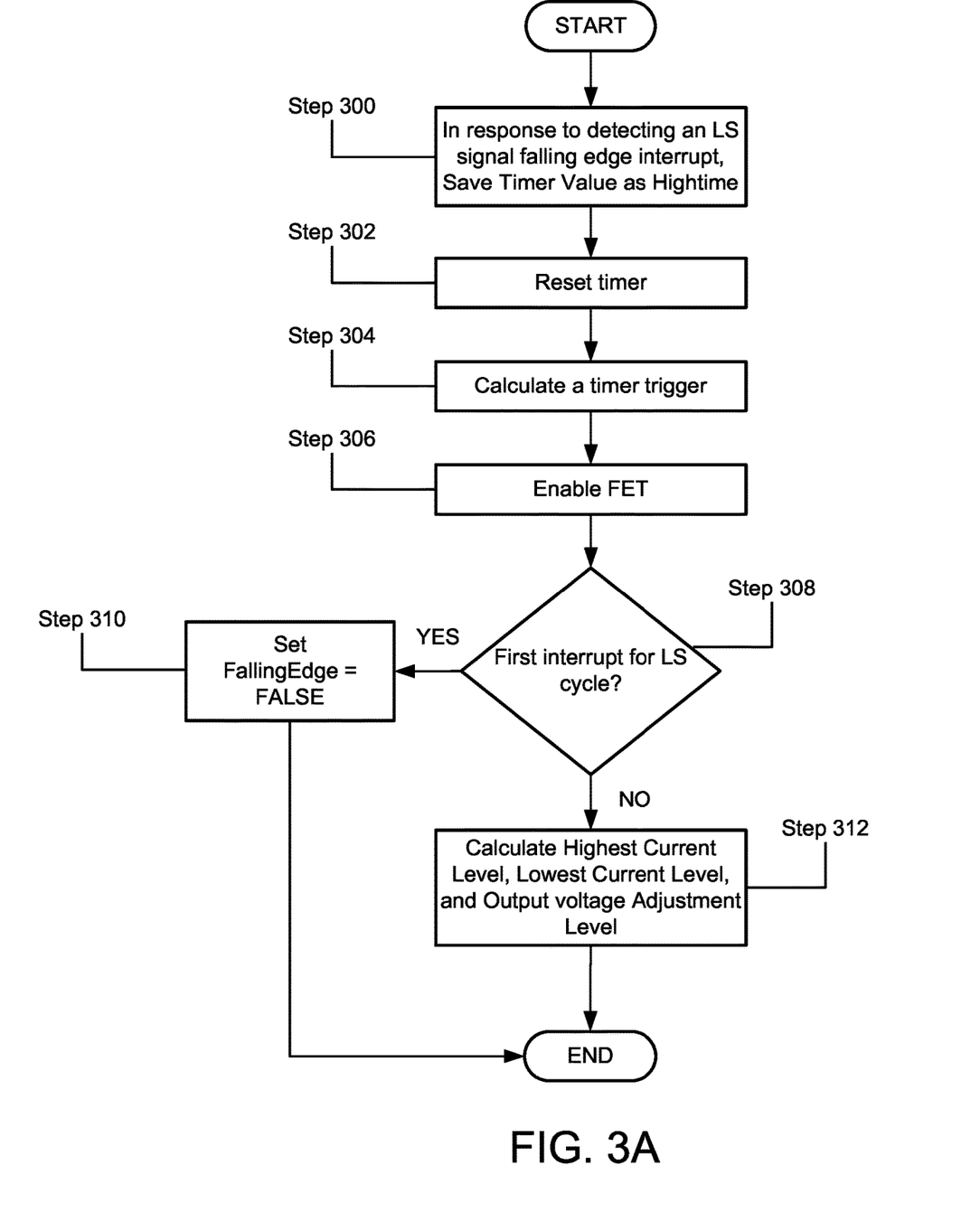
FIGS. 3A-3D show flow charts in accordance with one or more embodiments disclosed herein.

FIG. 3A describes an example method by a PSU upon triggering by a falling edge interrupt in the LS signal in accordance with embodiments disclosed herein. When the falling edge interrupt is detected, a timer value is saved as the time the LS signal was HIGH in Step 300. In Step 302, the timer is reset. In Step 304, a timer trigger is calculated for the current output of the PSU. This time trigger is associated with the timing that the PSU will output the current. In embodiments disclosed herein, the time trigger may be determined in accordance with a desired duty cycle and the PSU's output current level.

For example, the time trigger may be determined based on the PSU's output current level at a specific rate (e.g., 1 ms/A). In addition to the rate based determination, the time trigger may also be contained within a minimum and maximum value, for example a minimum value of 2 ms and a maximum value of 50 ms. In some embodiments, the time trigger for current output of the PSU may be based on a ratio of the output current of the PSU to a maximum current. For example, the time trigger may be determined based on a linear relationship to the ratio of the output current of the PSU to a maximum current. In this example, the time trigger is determined by multiplying the ratio by a scaling factor (e.g., 50 ms) and adding an offset (e.g., 5 ms).

In Step 306 the LS signal is pulled to a LOW level by enabling the FET in the PSU. In Step 308, it is determined if this falling edge interrupt is a first interrupt in an LS signal cycle. In embodiments disclosed herein, one of the PSUs initializes the LS signal dropping to the LOW level. For example, the PSU with the lowest output current may cause the LS signal to be pulled to a LOW level through the use of a timer. When it is detected that the LS signal is LOW, each PSU of the plurality of PSUs (including the aforementioned PSU with the lowest output current) performs the steps associated with FIG. 3A. Step 308 determines if this falling edge interrupt is a first interrupt that causes the LS signal to be pulled LOW (Yes) or if the falling edge interrupt is a result of detecting the LS signal has been pulled LOW (No). If the falling edge interrupt is a first interrupt (Yes), the falling edge is set to false and the process ends. In such embodiments, the PSU may then repeat steps of FIG. 3A.

If the interrupt is a result of detecting the LS signal has been pulled LOW (No in Step 308), in Step 312, the highest current level, lowest current level, and output adjustment levels may be calculated for the PSU. Other values may be determined at this time in accordance with embodiments disclosed herein. These values may be used to adjust the output of the power source, determine the duration of timers, etc.

Figure 3B:
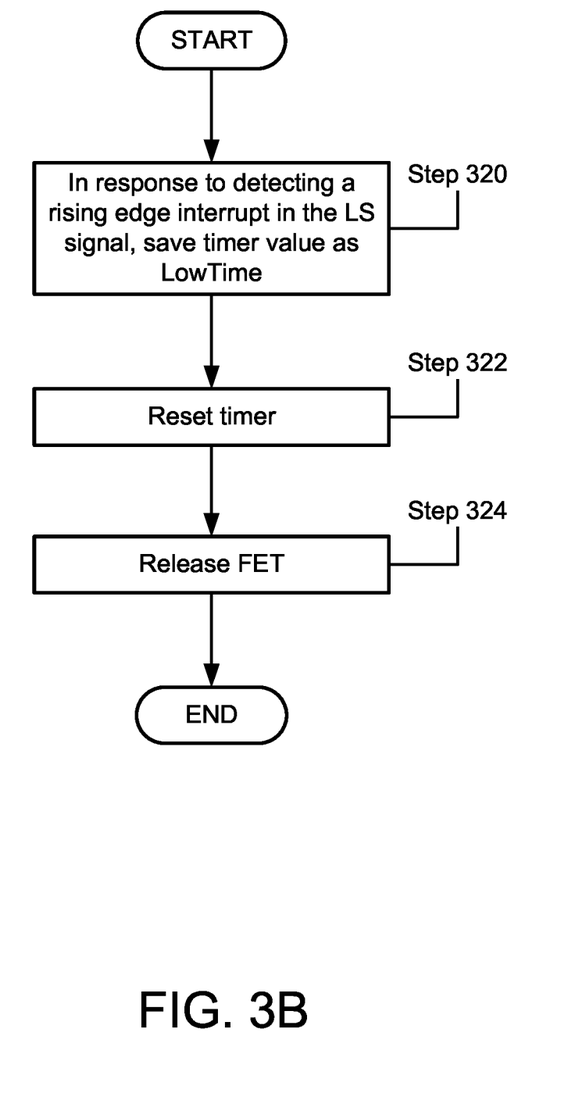

FIG. 3B describes an example method by a PSU upon triggering by detecting a rising edge interrupt in the LS signal in accordance with embodiments disclosed herein. In Step 320, the timer value is saved as the time in which the LS signal was LOW. In Step 322, the timer is reset. In Step 324, the FET in the PSU is released. In accordance with embodiments disclosed herein, if all the FETs in all the PSUs have been released, the LS signal is pushed to a HIGH level. Therefore, if the FET in Step 324 is the last FET released, the LS signal transitions to a HIGH level, perpetuating the LS signal cycle.

Figure 3C:
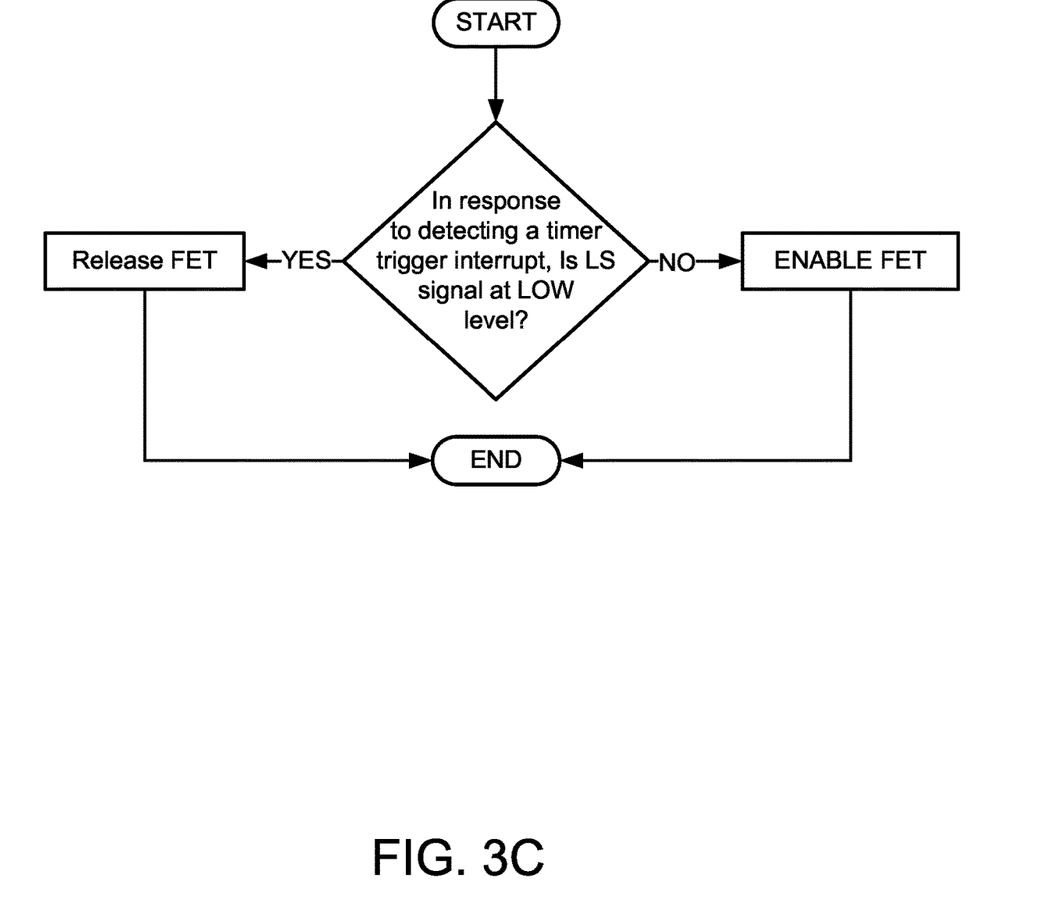

FIG. 3C describes an example method by a PSU upon detecting a timer trigger interrupt. In accordance with embodiments disclosed herein, the timer trigger interrupt may only occur at the PSUs that have either a maximum or minimum output current. The timer interrupt allows the PSUs with the maximum and minimum output current to control the state of the LS signal at the correct timing in accordance with embodiments. In FIG. 3C, when the timer expires, it is determined if the LS signal is at a LOW level. If the LS signal is LOW (Yes), the FET is released. If the LS signal is HIGH (No), the FET is enabled. Recall, enabling the FET when the LS signal is HIGH by this PSU will cause the LS signal level to transition to LOW.

Figure 3D:
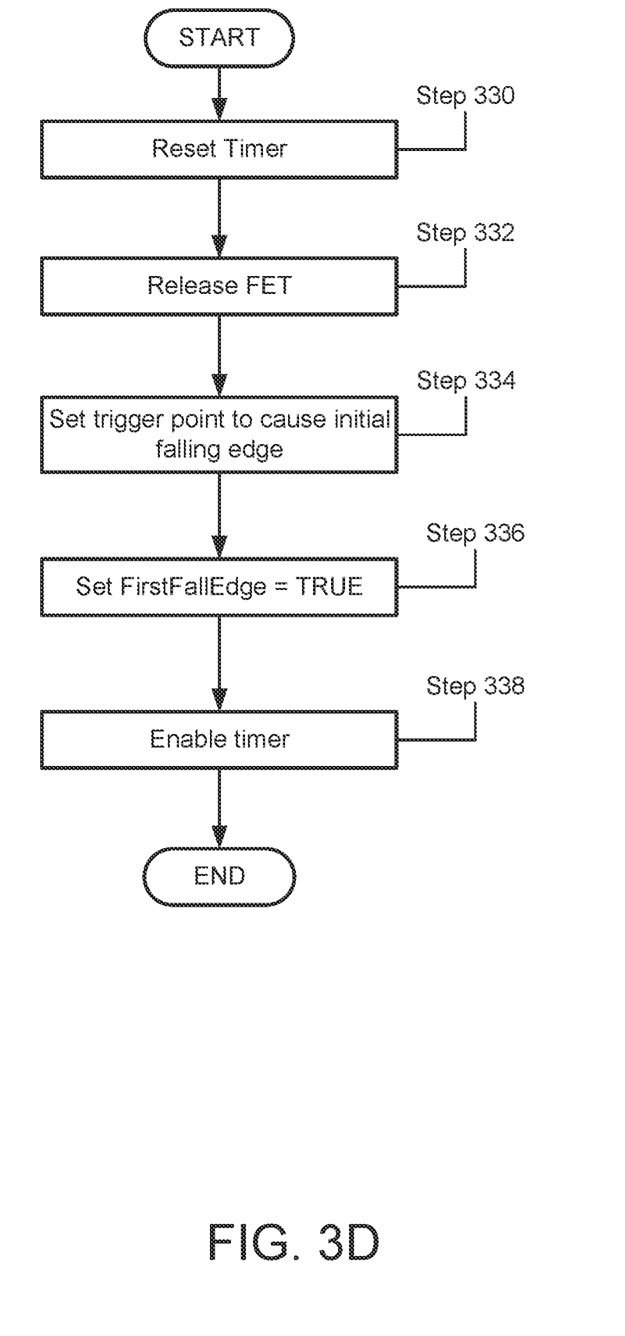

As previously noted with respect to Step 324, a timer trigger may be determined based on the current output of the PSU. In accordance with embodiments disclosed herein, when the timer trigger time has expired, the PSU enters a discharge event. FIG. 3D describes an example method performed by a PSU upon detecting a discharge event in accordance with embodiments disclosed herein.

Referring to FIG. 3D, in Step 330, the timer is reset, and the FET is released (turned off) in Step 332. Releasing the FET in this step may, or may not, cause the LS signal to transition to HIGH. For example, if the PSU is the unit with the highest output current, the released FET causes the LS signal to transition to HIGH in accordance with embodiments disclosed herein. Otherwise, releasing the FET would have no effect on the LS signal in accordance with embodiments disclosed herein. Steps 330 and 332 may be performed by all the PSUs upon expiration of the timer.

In accordance with embodiments disclosed herein, Steps 334 to 338 may only be performed by a PSU with the maximum or minimum output current. For example, if the PSU performing the method is the PSU with the maximum output current, in Step 334, a trigger point may be set to cause an initial falling edge in the LS signal. This trigger point may be set to a (relatively short) fixed value. In Step 336, the falling edge is set to TRUE and the timer for the trigger point is enabled in Step 338. Similarly, for example, the Steps 334 to 338 may be performed by the PSU with the minimum output current. In such embodiments, the trigger point may be set to a relatively longer fixed value. That is, the fixed value may be set to a high enough value to ensures the LS signal has returned to a HIGH state (i.e., all FETs in all PSUs have been released).

One of ordinary skill in the art will appreciate that the trigger point timer to cause the initial falling edge by the PSU with the highest or lowest output current and the trigger point timer that determines the timing for outputting the current in each PSU may be determined in coordination. Such coordination may be established in view of the type and specifications of the different current sources used and the desired characteristics of the overall power supply system.

Figure 4:
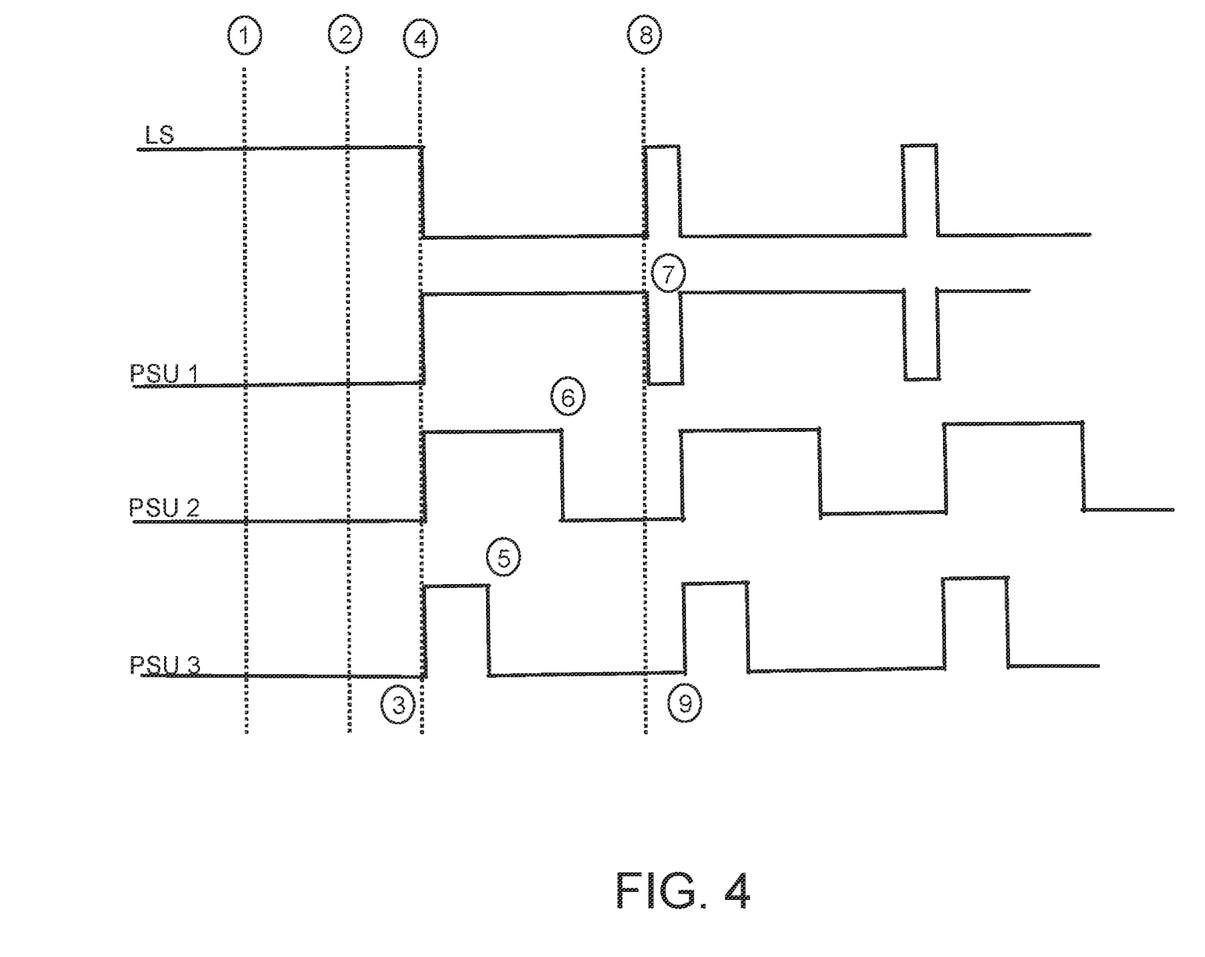
FIG. 4 illustrates an example in accordance with one or more embodiments disclosed herein.

FIG. 4 illustrates one example in accordance with one or more embodiments disclosed herein. FIG. 4 shows the LS signal and the timing of the output currents in an example with three PSUs (PSU 1, PSU 2, PSU 3) with output currents of 10 A, 6 A, and 2 A, respectively. In this example, the system is initiated by receiving an enable signal at (1). This enable signal may be received from the platform or initiated in response to some triggering event. After a short delay (e.g., 5 ms) each PSU enables a timer in (2). In this example, this timer is used by the PSU with the lowest current, PSU 3, to provide the trigger for the first falling edge in the LS signal at (3). For example, the timer may be set for 2 ms and, after the 2 ms, at (3), PSU 3 enables its FET. Enabling the FET in PSU 1 has the result of transitioning the LS signal from HIGH to LOW.

At (4), each PSU detects the falling edge in the LS signal and enables its FET. At this time, the PSU may determine a minimum current associated with the PSU. The PSU may also determine other parameters that are to be used in the operation of embodiments disclosed herein. The minimum current and such parameters may be used to adjust the power source and/or determine values of the timers disclosed herein. Each PSU also restarts their timer in (4).

As explained above with respect to FIG. 3A, each PSU determines a timer trigger. In the example of FIG. 4, each PSU determines the timer trigger based on a rate of 1 ms per 1 A of output current. That is, the timer for PSU 1 has a value of 10 ms, PSU 2 has a 6 ms timer, and PSU 3 has a 2 ms timer. At (5), after the 2 ms, the timer is triggered in PSU 3, and PSU 3 releases its FET. This has no effect on the LS signal. In (6), after 6 ms, the timer is triggered in PSU 2, and PSU 2 releases its FET. This also has no effect on the LS signal.

At (7), after 10 ms, the timer in PSU 1 is triggered, and PSU 1 releases its FET. When PSU 1 releases its FET, this causes the LS signal to transition from LOW to HIGH. At (8), each PSU detects the rising of the LS signal to HIGH causing a restart of their timers. At this time, the PSUs may calculate a maximum current and other parameters to be used. These parameters, as well as the parameters determined in (4), may be used to monitor and adjust the power source and PSU accordingly and/or determine values of the timers.

At PSU 3, the timer for the trigger for the first falling edge in the LS signal is restarted in (8), causing PSU 3 to enable its FET after 2 ms in (9). From (9), the process may cycle, resulting in a balanced, synchronized power output of the power system.

FIG. 4 demonstrates one example in accordance with embodiments disclosed herein. One of ordinary skill in the art will recognize that other variations of the timings that operate based on the common LS signal in conjunction with the disclosed electronics may be used.

Embodiments disclosed herein advantageously provide a current balancing and synchronization method and device that creates simultaneous digital communication shared among multiple PSUs using a signal wire. The signal wire eliminates the need for additional components, such as a digital logic module, to control the outputs of a plurality of PSUs and/or adjust the individual power sources in a plurality of PSUs. Embodiments require little additional hardware (e.g., a FET, a resistor, and a diode) when compared to any purpose-built chip. Embodiments may provide a highly reliable power system that balances the contributing currents while avoiding overloading any single power source.

Embodiments disclosed herein may provide a highly reliable power system for providing power back services in computer network environments. More specifically, embodiments may provide The advantages discussed above throughout the detailed description should be understood as being examples associated with one or more problems being solved by embodiments of the invention. However, one or more embodiments of the invention disclosed herein should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method of balancing a supply current in a Power Supply Unit (PSU), the method comprising:
    detecting a falling edge interrupt associated with a common Load Share (LS) signal;
    in response to detecting the falling edge of the LS signal, enabling a field effect transistor (FET) and starting a timer;
    prior to starting the timer, determining a time trigger for the timer based on a current output level of a power source in the PSU, wherein:
        the time trigger for the timer is determined based on the current output level and a fixed rate in milli-seconds per ampere, and
        the time trigger is further limited to a minimum and maximum value of time;
    outputting a current at the current output level for the duration of the time trigger; and
    at the time trigger, releasing the FET and resetting the timer.

2. The method of claim 1, wherein enabling the FET causes the LS signal associated with the PSU and a second PSU to transition from a HIGH state to a LOW state.

3. The method of claim 1, wherein releasing the FET causes the LS signal to transition from a LOW state to a HIGH state.

4. The method of claim 1, the time trigger for the timer is determined based on a ratio of the output current level of the PSU to a maximum current level.

5. A Power Supply Unit (PSU) comprising:
    a power source that supplies an output current of the PSU;
    a current sensing device that measures the current output from the power source;
    a processor that monitors a Load Share (LS) signal, wherein the LS signal determines a timing for outputting current by the PSU and the processor is adapted to:
        detect a falling edge interrupt associated with the LS signal;
        in response to detecting the falling edge of the LS signal, enable the FET and start a timer;
        prior to starting the timer, determine a time trigger for the timer based on a current output level of a power source in the PSU, wherein:
            the time trigger for the timer is determined based on the current output level and a fixed rate in milli-seconds per ampere, and
            the time trigger is further limited to a minimum and maximum value of time;
        output a current at the current output level for a duration of the time trigger; and
        after the duration, release the FET and reset the timer; and
    circuitry for controlling the timing of the output current and the LS signal.

6. The PSU of claim 5, the circuitry comprising: a Field Effect Transistor (FET), a resistor, and a diode and an input voltage.

7. The PSU of claim 6, wherein the FET, the resistor, the diode, and the input voltage are connected in series.

8. The PSU of claim 5, wherein enabling the FET causes the LS signal associated with the PSU and a second PSU to transition from a HIGH state to a LOW state.

9. The PSU of claim 5, wherein releasing the FET causes the LS signal to transition from a LOW state to a HIGH state.

10. The PSU of claim 5, wherein the time trigger for the timer is determined based on a ratio of the output current level of the PSU to a maximum current level.

11. A system for providing power, the system comprising:
    a plurality of Power Storage Units (PSUs) connected in parallel to a power bus,
        wherein each PSU comprises:
            a power source that supplies an output current of the PSU;
            a current sensing device that measures the current output from the power source;

a processor that monitors a Load Share (LS) signal, wherein the LS signal determines a timing for outputting current by the PSU and the processor is adapted to:
- detect a falling edge interrupt associated with the LS signal;
- in response to detecting the falling edge of the LS signal, enable the FET and start a timer;
- prior to starting the timer, determine a time trigger for the timer based on a current output level of a power source in the PSU, wherein:
  - the time trigger for the timer is determined based on the current output level and a fixed rate in milliseconds per ampere, and
  - the time trigger is further limited to a minimum and maximum value of time;
- output a current at the current output level for a duration of the time trigger; and
- after the duration, release the FET and reset the timer; and circuitry for controlling the timing of the output current based on the LS signal.

12. The system of claim 11, wherein enabling the FET in a first PSU of the plurality of PSUs causes the LS signal associated with the first PSU and a second PSU to transition from a HIGH state to a LOW state.

13. The system of claim 11, wherein releasing the FET in a second PSU of the plurality of PSUs causes the LS signal to transition from a LOW state to a HIGH state.

14. The system of claim 11, wherein:
- enabling the FET in a first PSU of the plurality of PSUs causes the LS signal to transition from a HIGH state to a LOW state, wherein the output voltage level of the first PSU is a lowest output voltage of the plurality of PSUs; and
- releasing the FET in a second PSU of the plurality of PSUs causes the LS signal to transition from a LOW state to a HIGH state, wherein the output voltage level of the second PSU is a highest output voltage of the plurality of PSUs.

* * * * *